May 31, 1966 J. E. SLACK 3,253,325
METHOD OF MAKING A SLIP RING ASSEMBLY
Original Filed Feb. 26, 1962 2 Sheets-Sheet 1
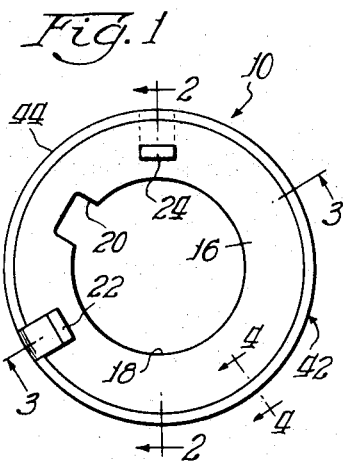
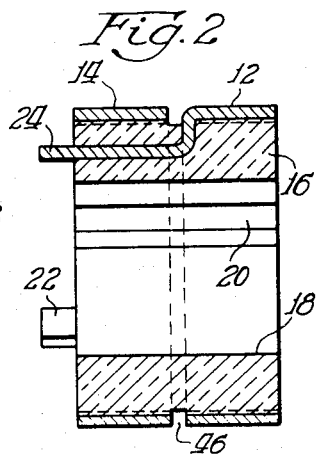
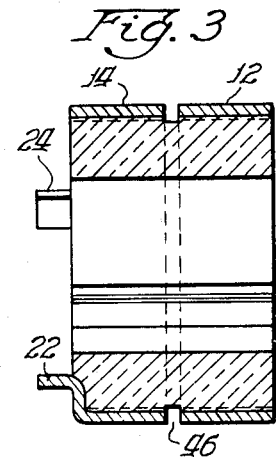
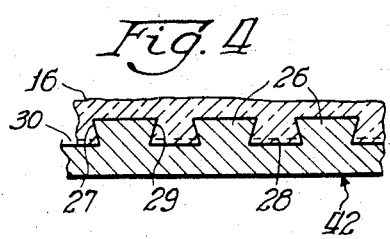
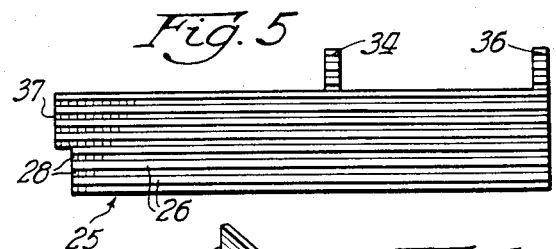
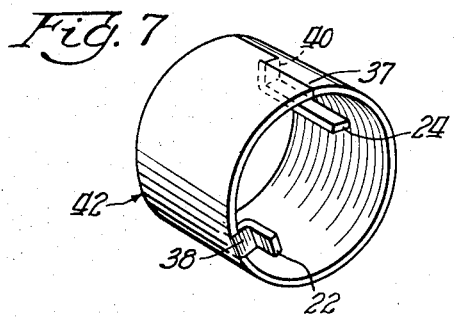
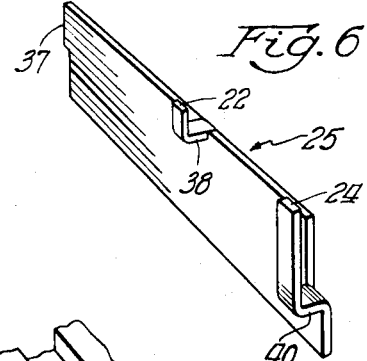
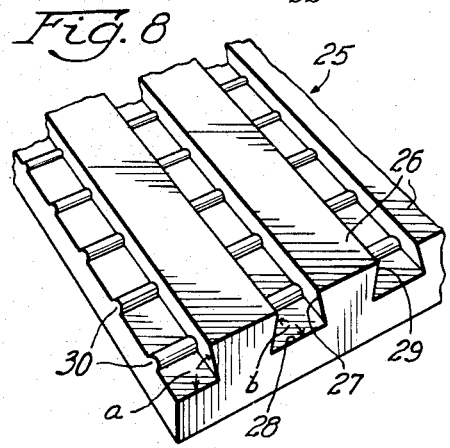
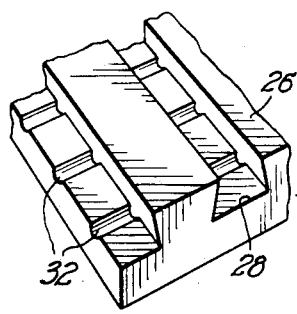
INVENTOR.
James E. Slack
BY
Herman E. Smith
Atty.

May 31, 1966  J. E. SLACK  3,253,325
METHOD OF MAKING A SLIP RING ASSEMBLY
Original Filed Feb. 26, 1962  2 Sheets-Sheet 2

INVENTOR.
James E. Slack
BY
Herman E. Smith
Atty.

United States Patent Office 3,253,325
Patented May 31, 1966

3,253,325
METHOD OF MAKING A SLIP RING ASSEMBLY
James E. Slack, Westchester, Ill., assignor to Borg-Warner Corporation, Chicago, Ill., a corporation of Illinois
Original application Feb. 26, 1962, Ser. No. 176,869. Divided and this application Feb. 23, 1965, Ser. No. 439,126
1 Claim. (Cl. 29—155.5)

This application is a division of application Serial No. 176,869, James E. Slack, entitled "Slip Ring Assembly and Method of Making," filed February 26, 1962.

This invention relates to current collecting and distribution devices and more particularly to the method of making molded slip ring assemblies.

A number of problems have existed up to the present time in making current-collecting and distributing devices. For example, it has often been a problem to secure slip rings to insulation material in a manner such that they will not tear loose easily from the insulation material. Controlling the relative location of slip rings and conductor leads other than those to which a particular slip ring is attached has also posed a problem. Difficulties have also been encountered where too large a number of parts have gone into slip ring assemblies. This has caused endless difficulty both in the original assembly and later in the actual operation of the device.

One of the objects of this invention is to provide a unitary molded slip ring assembly of simple inexpensive construction. Another object is to provide such an assembly wherein each of the slip rings and its respective conductor lead is integral, that is, both the slip ring and conductor lead being formed from the same material. Thus, no operation is required to connect the conductor lead to the slip ring. A further object is to eliminate the problem of loose parts.

Another object is to provide an assembly in which the construction is such that contact between the conductor leads and either the non-associated slip rings or the shaft upon which the slip ring assembly is mounted will not occur.

Other objects and advantages will be apparent as the description of certain embodiments of the invention proceeds, taken in connection with the accompanying drawings in which:

FIG. 1 is a view in elevation of one embodiment of a unitary molded slip ring assembly;

FIG. 2 is a view in section of the slip ring of FIG. 1 taken along the line 2—2 of FIG. 1;

FIG. 3 is a sectional view taken along the line 3—3 of FIG. 1;

FIG. 4 is an enlarged partial sectional view taken on line 4—4 of FIG. 1;

FIG. 5 is a plan view of a flat metal stamping from which the slip rings and connector leads are made;

FIG. 6 is a perspective view of the stamping of FIG. 5 after conductor leads have been formed from the stamping;

FIG. 7 is a perspective view showing the stamping of FIG. 6 bent into annular form;

FIG. 8 is an enlarged perspective of a portion of the stamping showing a dovetail groove and rib pattern with projections formed in the groove portion;

FIG. 9 is an enlarged perspective of a portion of the stamping showing an alternative construction with depressions formed in the groove portion;

Figure 11:
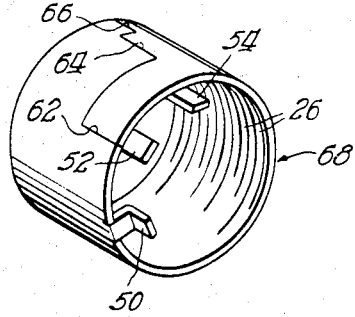
FIGS. 10–13 illustrate a second embodiment of the invention wherein a slip ring assembly has 3 slip rings.

Referring now to FIGS. 1–3, there is shown a unitary molded slip ring assembly 10 comprising slip rings 12 and 14 formed on molded insulation material 16. The slip ring assembly 10 is adapted to be mounted on a rotating shaft (not shown) so that an inner surface 18 of the molded insulation material will be in contact with said shaft. The assembly 10 may be secured to the shaft by means of a key (not shown) and keyway 20, for example. The slip rings 12 and 14 have formed thereon respectively conductor leads 24 and 22 by a method hereinafter to be described. It will be noted from FIG. 2 that the lead 24 is embedded within the molded material.

The method of making the unitary slip ring assembly will not be described. Slip rings 12 and 14 are made from an electrically conductive material such as copper, for example. Initially, a blank 25 (see FIG. 5) is stamped from whatever kind of material which is to be used for the slip rings and conductor leads. This material has been previously roll-formed to provide the dovetailed cross-section shown in FIG. 4. A pattern comprising ribs 26 and grooves 28 is formed in one surface of the blank 25 in a longitudinal direction as shown in FIG. 5. During the forming of the grooves 28 small deformations such as projections 30, or in the alternative, indentations 32 are formed therein for a purpose to be hereinafter described. The tops of the ribs 26 have been flattened to expand the metal sidewise into the adjacent grooves 28 to leave a dovetailed cross-section as shown in FIGS. 8 and 9. Thus, the sides 27 and 29 of a rib form acute angles $a$ and $b$ with the bottom of an adjacent groove 28. This is a continuously extending dovetailed cross-section. Conductor leads 22 and 24 are then formed from the tabs 34 and 36 respectively. The end of the blank 24 opposite the end having the tab 36 is formed with a projecting portion 37 for reasons to become later apparent. The leads 22 and 24 are substantially L-shaped portions. The lead 22 remains connected to the slip ring blank 25 by the portion 38 and the lead 24 remains connected to the slip ring blank by the portion 40, as seen in FIG. 6. It will be appreciated that in off-setting the lead 24 from the blank 25, a shearing operation is necessary, as well as a bending operation to form the portion 40 at substantially right angles to the blank 25. A bending operation is also necessary to offset the lead 22 from the blank 25 as shown in FIG. 6. After all this is done the blank is ready for bending into the annular form 42 shown in FIG. 7.

It will be noted in FIG. 11 that the projecting portion 37 of the blank 25 fits together with the portion of the blank 25 remaining after the lead 24 has been sheared therefrom.

After forming the blank 25 into the annular form 42 molded insulation material is applied to the inside surface of the blank. The molded material may comprise, for example, a thermo-reactive phenolic resin in combination with a heat-resistant filler such as asbestos fiber, both of these items being commercially available. It will be appreciated that the lead 24 becomes firmly embedded in the molded material after the latter has set.

When the assembly is ready for use, it is mounted, for example, on the rotary member to which it is to be secured. A slight cut may be taken over the outer surface 44 to true this surface with respect to the rotating member. It is at this juncture that the blank 24 in its annular form 42 is separated into the individual slip rings 12 and 14 by merely cutting groove 46 in the assembly and through the annular form. This leaves two separate slip rings 12 and 14 with their respectively integral conductor leads 24 and 22.

It will also be noted that the slip rings 12 and 14 are tightly secured to the molded material by virtue of the dovetail arrangement as illustrated in FIG. 4. In addition, the projections 30 or in the alternative, the indentations 32, prevent relative rotary movement between the molded material and the slip rings.

Figure 10:
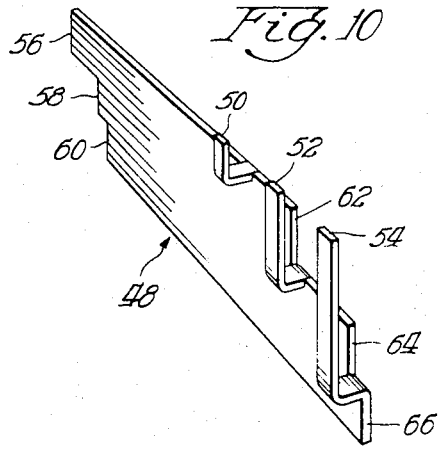
Figure 12:
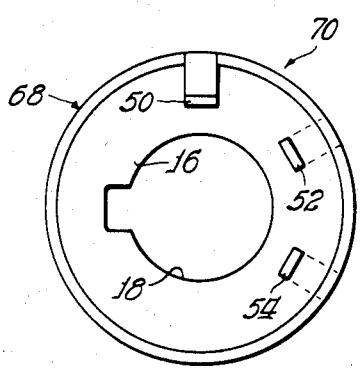
Figure 13:
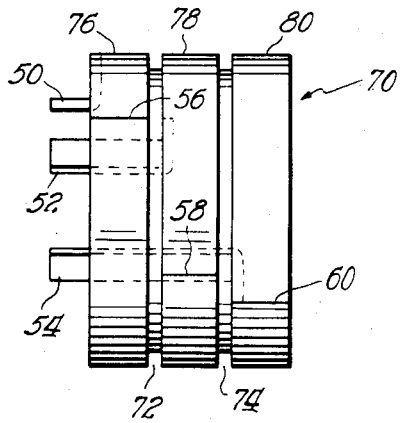

A second embodiment of the invention is shown in FIGS. 11-13 wherein the molded slip ring assembly has three slip rings each having an integral conductor lead. A blank 48 is formed from electrically conductive material in which has been impressed the same rib and groove pattern of FIG. 5. By a shear forming operation two conductor leads 52 and 54 are sheared from the blank 48 and the three leads 50, 52, and 54 are offset in the same direction from the plane of the blank 48 as shown in FIG. 10. At the left end of the blank 48 as shown in FIG. 10 portions are sheared therefrom so that when the blank is bent into the annular shell form of FIG. 11 the edges 56, 58, and 60 will substantially mate with the edges 62, 64, and 66. Insulation material 16 is then molded on the inside of the annular shell 68 to form a molded assembly 70 having an inner surface 18 for positioning on a shaft or other rotary member. When positioned on such rotary member grooves 72 and 74 are cut in the molded assembly 70 through the conductive material leaving insulated slip rings 76, 78, and 80 with their respectively attached conductor leads. A truing cut may be taken on the assembly 70 either before or after the grooves 72 and 74 are cut therein. It will be appreciated that the slip ring assemblies having a greater number of slip rings and attached conductor leads may be formed in substantially the same manner by following the teaching herein.

It will be observed that these devices can be relatively simply manufactured. In the slip ring assembly, for example, there are no loose parts, and contact of the conductor leads with either the shaft upon which the assembly is mounted or with a slip ring to which it is not attached is absolutely prevented. In the manufacture of the slip ring assembly, there are no complicated operations such, for example, as matching up apertures in separate slip ring mountings designed to receive conductor leads.

This integral construction of slip rings and conductor leads also eliminates the problem of lack of control in positioning the slip rings with respect to the leads.

In addition, since the slip rings and leads are necessarily of the same material no differences of electrical potential can be set up to cause deterioration of the insulation material.

The dovetailed rib and groove pattern advantageously provides means for solidly securing the slip rings in the molded material. In addition the deformations made in the bottom of the grooves help to prevent relative circumferential movement between the slip rings and the insulation material.

While certain preferred embodiments of the invention have been specifically disclosed, it is understood that the invention is not limited thereto as many variations will be readily apparent to those skilled in the art, and the invention is to be given its broadest possible interpretation within the terms of the following claim.

I claim:

The method of making a molded slip ring assembly comprising the following steps: forming a longitudinal rib and groove pattern on one side of substantially flat electrically conductive material; forming a series of small deformations on the bottom of said grooves; flattening the top of said ribs so that the ribs and grooves form a substantially dove-tail cross-section; stamping a substantially flat blank having a plurality of coextensive laterally extending portions from said material at one end thereof; forming on said material a plurality of conductor leads by bending said laterally extending portions of said material into positions offset from the plane of said flat blank and into a plane parallel to said first plane whereby said end is stepped; forming the opposite end of said material into a mating stepped configuration bending said blank into an annular form so that the rib and groove pattern is on the inside surface thereof with portions extending beyond an edge of the annular form and with the stepped ends in abutting relationship; molding an insulating material on the inside of said annular form including the portions therein and cutting at least one annular groove in the assembly so as to form a plurality of slip rings separated from each other but which remain individually secured to their respective conductor leads and remain firmly secured to the molding material.

References Cited by the Examiner

UNITED STATES PATENTS

| | | | |
|---|---|---|---|
| 1,631,461 | 6/1927 | Bonsieur | 29—155.54 XR |
| 1,826,443 | 10/1931 | Aufiero et al. | 29—155.54 XR |
| 2,038,419 | 4/1936 | Cotterman | 29—155.54 XR |
| 2,834,095 | 5/1958 | Lazzopina et al. | 29—155.55 XR |
| 2,880,402 | 3/1959 | Gardner | 339—5 |
| 2,985,781 | 5/1961 | Julian | 310—232 |
| 3,140,414 | 7/1964 | Sksodt et al. | 29—155.54 XR |

JOHN F. CAMPBELL, *Primary Examiner.*

WHITMORE A. WILTZ, *Examiner.*

R. W. CHURCH, *Assistant Examiner.*